United States Patent [19]

Hadfield

[11] Patent Number: 5,038,215
[45] Date of Patent: Aug. 6, 1991

[54] IMAGING APPARATUS WITH IMPROVED SYNCHRONIZATION

[75] Inventor: Kevin A. D. Hadfield, Chelmsford, United Kingdom

[73] Assignee: EEV Limited, Chelmsford, United Kingdom

[21] Appl. No.: 464,857

[22] Filed: Jan. 17, 1990

[30] Foreign Application Priority Data

Jan. 19, 1989 [GB] United Kingdom ............... 8901200

[51] Int. Cl.$^5$ .................. H04N 3/14; H04N 5/335
[52] U.S. Cl. ..................... 358/213.11; 358/150; 358/213.22; 358/213.26
[58] Field of Search ............ 358/150, 64, 213.11, 358/213.26, 213.27, 213.29, 213.18; 377/69, 78

[56] References Cited

U.S. PATENT DOCUMENTS

| 4,278,999 | 7/1981 | Ganguly et al. | 358/213 |
| 4,498,106 | 2/1985 | Sato et al. | 358/213 |
| 4,506,299 | 3/1985 | Berger et al. | 358/213.24 |
| 4,620,180 | 10/1986 | Carlton | 377/64 |
| 4,684,993 | 8/1987 | Berger et al. | 358/213.31 |
| 4,723,168 | 2/1988 | Theuwissen | 358/213.31 |
| 4,845,670 | 7/1989 | Nishimoto et al. | 358/64 |

FOREIGN PATENT DOCUMENTS

| 3228199 | 2/1983 | Fed. Rep. of Germany. |
| 8221396 | 6/1984 | France. |
| 8314403 | 3/1985 | France. |
| 2174567 | 11/1986 | United Kingdom. |

OTHER PUBLICATIONS

Electronic Pictures From Charged Coupled Devices, NASA Tech Briefs (Spring 79), vol. 4, No. 1.

Primary Examiner—James J. Groody
Assistant Examiner—Tuan V. Ho
Attorney, Agent, or Firm—Spencer & Frank

[57] ABSTRACT

A CCD imaging array includes one or more shift registers. By injecting a charge packet at one end of the shift register, at times related to the start of line read out, then the charge packet reaches the other end of the shift register at the end of the line period. Thus the shift register can be used to generate line synchronization signals. The technique can also be applied for more complex waveform generation and for field generation.

19 Claims, 4 Drawing Sheets

IMAGING APPARATUS WITH IMPROVED SYNCHRONIZATION

This invention relates to an imaging apparatus. In particular, but not exclusively, it relates to an imaging apparatus comprising a frame transfer device such as a CCD (Charge Coupled Device).

BACKGROUND OF INVENTION

Cameras using CCD's are now becoming commonplace. However, a significant amount of logic circuitry is generally required to be used in conjunction with CCD elements, for sampling and timing purposes. Clearly, there are many different sizes and types of CCD which require different logic circuits, clock waveforms and speeds etc. Furthermore, with the onset of high resolution systems, CCD's of even greater density and speed will be required. Thus, whenever one CCD in a camera is to be replaced by another of different type, for upgrading or other purposes, it is also necessary to replace the logic circuitry which provides the waveforms for that CCD. This can be inconvenient and prohibitively expensive.

It is also occasionally observed that a CCD camera operating with a very high gain shows a vertical fixed pattern on the picture. This is thought to be due to feed-through from the counter in the CCD gate array which is arranged to count at pixel rate. During the counting process different numbers of counter stages will toggle at any time and this causes variations in power supply, leading to perturbations which result in small amounts of amplitude and/or pulse width modulation on the CCD waveforms. An apparatus is also required which solves this problem in a straight forward manner.

BRIEF SUMMARY OF THE INVENTION

According to one aspect of the present invention there is provided solid-state imaging apparatus comprising an imaging array having a region on which an image is formed, means to produce electrical charges representing said image, and output means to produce output signals representative of said image from said electrical charges; shift register means having clock input means, input port means, and an output port; means for introducing at least one packet of charge into said input port means of said shift register means; clock means for applying clock signals to said clock input means of said shift register means, said clock means for applying clock signals causing said electrical charges and said at least one packet of charge to be clocked respectively through said imaging array and said shift register means at rates which are related to one another; and means for using signals obtained from said output port as synchronising waveforms for said imaging array.

According to another aspect of the present invention, there is provided synchronisation waveform signals for an imaging array, said apparatus comprising shift register means having clock input means, input port means, and an output port, means for introducing at least one packet of charge into said input port means of said shift register means; clock means for applying clock signals to said clock input means of said shift register means, said clock means causing said at least one packet of charge to be clocked through said shift register means; said shift register means having a predetermined number of stages such that said at least one packet of charge introduced into said input port means emerges from said output port at at least one predetermined later time period so as to provide said synchronisation waveform signals.

If the array is an N×M array where N is the number of pixels per line and M the number of lines, then the shift register may be of N or M stages, or two registers may be provided, one of N stages and one of M stages.

In this way, a signal of logic one, for example, introduced at the start of the N-stage shift register at the beginning of the active line time will reach the other end of the shift register at the end of the active line time. Thus, a precise line synchronisation can be established if N=line period. Alternatively if the register has more than N stages it can be used to time the complete line period, which comprises the active line period plus the blanking period. Similarly, the same or further shift registers can be used to generate field synchronisation signals by being shifted only once every line period.

In the case where a dummy readout register is produced for noise cancellation purposes etc, the dummy register may be the same length as the readout register, the dummy register then being used to generate line synchronisation pulses as well as for noise cancellation purposes.

In a further arrangement the readout register itself may be used to generate line synchronisation pulses, these being injected into the far end of the readout register at suitable instants of time. In this case the readout register may be the same length as the number of pixels N in a line, in which case charge is injected after image information has started to be readout, or may have more than N stages, in which case charge can be injected into one or more suitable locations prior to image information readout.

The array is preferably a CCD array.

The shift register and array are most preferably constructed on one semiconductor integrated circuit chip. The shift register may comprise an auxiliary shift register constructed adjacent the array, an additional register on the array, or may comprise the read out register of the array itself.

BRIEF DESCRIPTION OF THE DRAWINGS

Embodiments of the invention will now be described by way of example only with reference to the accompanying drawings in which.

DESCRIPTION OF PREFERRED EMBODIMENTS

Figure 1:
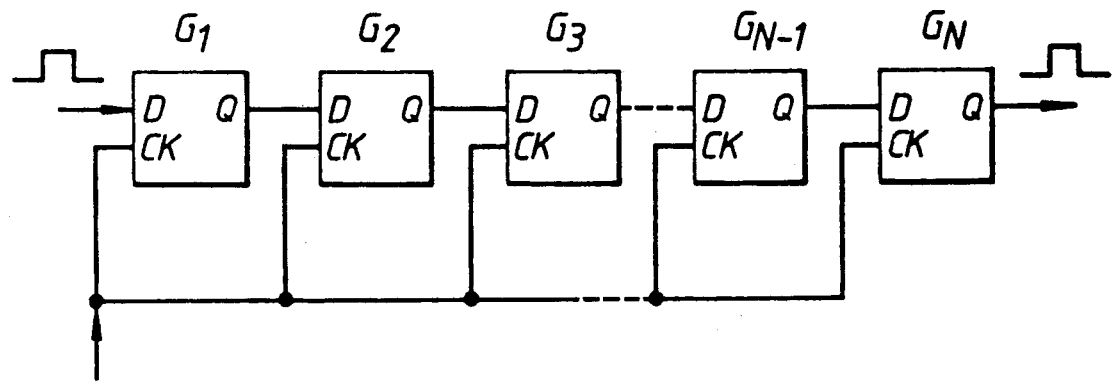
FIG. 1 shows a schematic shift register.

Referring to FIG. 1, there is shown a shift register comprising a plurality of individual gate elements which are cascaded so that a charge packet introduced into gate 1 is clocked sequentially through each gate until it finally emerges, after N clock pulses, from gate N. It is important that the layout of such a shift register structure is one which ensures minimum power rail lengths and interconnection between successive stages since in practice it is found that feed-through to video circuitry does depend slightly upon location in the gate array.

Figure 2:
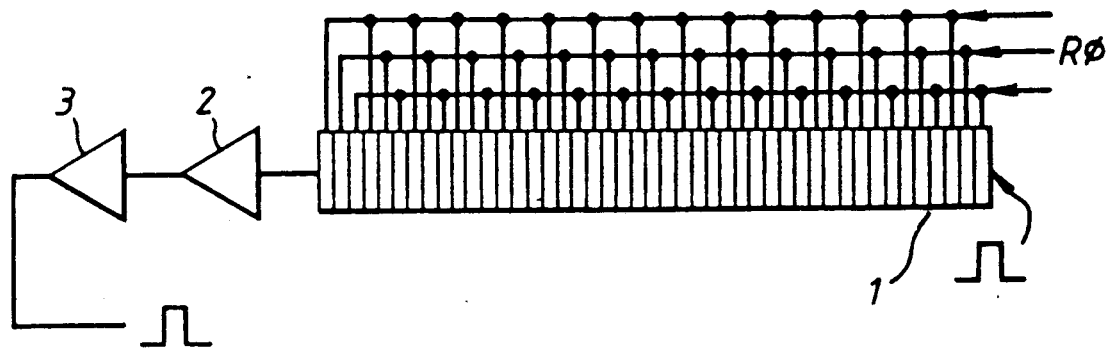
FIG. 2 shows how a shift register can be associated with a charge coupled device to determine the active line period.

FIG. 2 shows how the shift register technique may be implemented by fixing an additional register to a CCD. The register may conveniently be mounted adjacent the read out register of the CCD or could be placed at the other end of the device. The register 1 is supplied with clock waveforms in the form of a three phase clock signal R0. A charge packet injected at one end, in this case the right hand end, of the shift register device is pulsed along the device in accordance with the clock signals until it is sensed at the other end by a charge sense amplifier 2. During this period it will be noted the gate array is not performing any sub-pixel rate counting and therefore cannot cause any picture interference. The signal from the charge sense amplifier 2 is passed through a buffer 3 which is arranged to buffer the signal to a 5 volt CMOS level. The signal of logic one emerging at this time indicates the end of an active line period if the signal is fed into the device at the beginning of the line period.

This extra register can be smaller than the ordinary read out register and thus will not significantly increase chip area and power consumption. Since the extra shift register is fixed at the time of mask design then it automatically will be the correct length for the CCD independent of the number of active pixels.

If the CCD has N light sensitive elements along each line then an N stage shift register will time the active line period. It may be advantageous to have a longer shift register to time the complete line period comprising the active line period and line blanking period. In one example, a CCD has 385 pixels per line, thus a 385 stage shift register can correctly time the active line period of 52 μs (assuming a 625 line standard). In order to time the complete line period (including blanking) of 64 μs the length of the shift register required is 474 stages (or 385 times 64/52, with the product being rounded to the next-highest integer).

Figure 3:
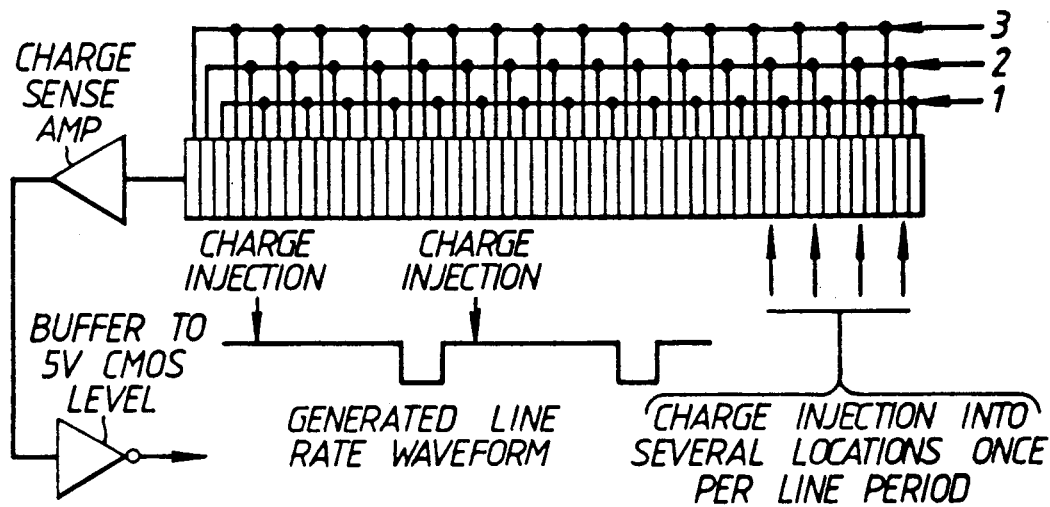
FIG. 3 shows how waveforms may be generated using a shift register.

However, the simple technique outlined above to determine the duration of the active line period is not sufficient in all circumstances to allow a CCD with any number of horizontal pixels to be simply plugged into the same logic circuitry. The main problem is that the read out register frequency is also related to the period of line rate pulses which are respectively known in the art as LS, MS, MVB, CLAMP and S01-3. If the master oscillator were varied to keep the active line period constant it would be found that the period of the line rate pulses decreases as the number of active horizontal CCD pixels increases. To overcome this particular problem a shift register may be fabricated with the same number of stages as there would be R0 pulses in a complete line period. Such a scheme is shown in FIG. 3. In this case, each shift register is loaded once per line period with a plurality of charge packets at suitable locations in the register (four packets are shown schematically in the figure) and is clocked continuously by the standard three phase waveforms at R0 rate so that the outputs can be used directly as the required line rate waveforms LS, MS, etc.

Some of these line rate waveforms may be generated from a shorter shift register which is loaded during the active line time and runs only during the blanking period involved in a video signal to generate the waveforms. Accordingly, it will be appreciated that if all the line rate waveforms are defined by structures on the CCD chip itself then the user need only select a suitable master clock frequency to enable the system to use CCDs with any number of active horizontal pixels without requiring any change in the logic circuitry. The buffers which are used to drive the CCD electrodes should be designed to operate over as wide a bandwidth as possible to make full use of this application.

In a further embodiment of the invention field rate waveforms may be generated by using shift registers which are clocked only once every line. Care should however be taken to ensure that dark current build up, especially at elevated temperatures, cannot corrupt the waveforms.

Figure 4:
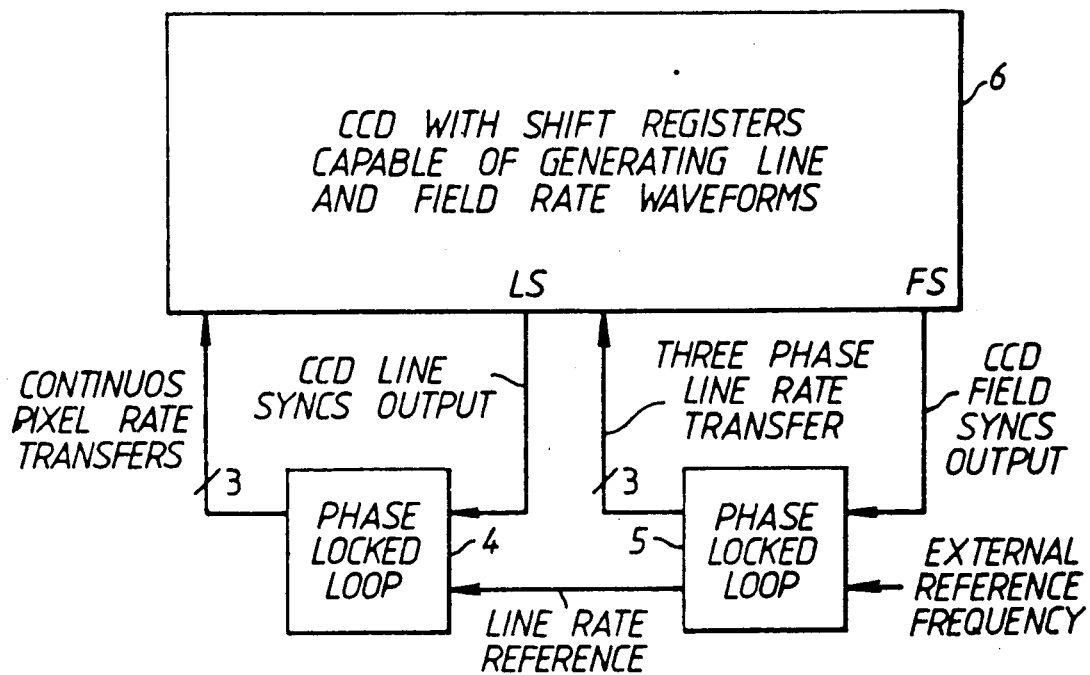
FIG. 4 shows, schematically, apparatus embodying the invention and used for generating a clock waveform.

FIG. 4 shows a system where it is possible to overcome the problem of the master clock frequency not being able to be selected so as to give the correct read out register frequency. In this system two phase locked loops 4 and 5 are used to generate pixel frequency and television line frequency respectively by being connected to an external reference frequency such as 50 or 60 Hz mains. The respective phase locked loops are arranged to lock to the shift register generated line sync and field sync outputs which are generated by a CCD device 6 which already has upon it shift registers of the type described with reference to FIG. 2 or FIG. 3 for generating appropriate waveforms. The phase locked loop is then locked to these respective synchronisation signals in order to generate pixel rate and line rate transfer clocking signals.

Figure 5A:
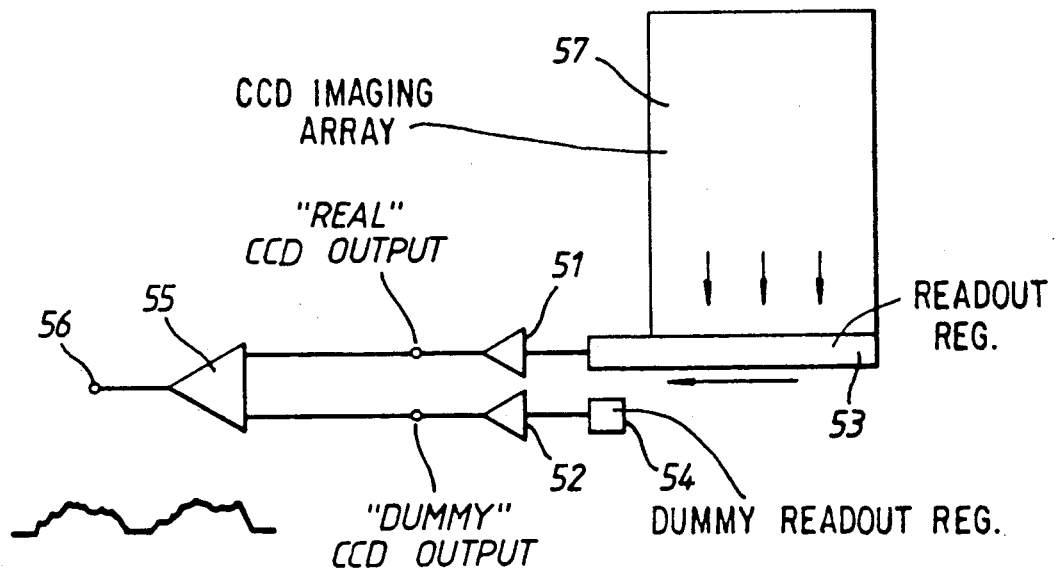
FIG. 5A shows a prior art CCD imager having output noise cancellation using a dummy CCD shift register.

FIG. 5A shows a prior art CCD imager having a CCD imaging array 57, and a read out register 53 and a dummy read out register 54. The outputs of the readout and dummy registers are amplified in respective charge sense amplifiers 51, 52. The amplified outputs are applied to a differential amplifier 55 which subtracts the output of the dummy register 54 from that of the read out register 53. This subtraction tends to cancel out noise produced in the read out register, thereby producing an output having reduced noise. It is found in practice that satisfactory noise cancellation is obtained by using only a few stages, as this produces substantially the same noise cancellation as a full length dummy register.

Figure 5B:
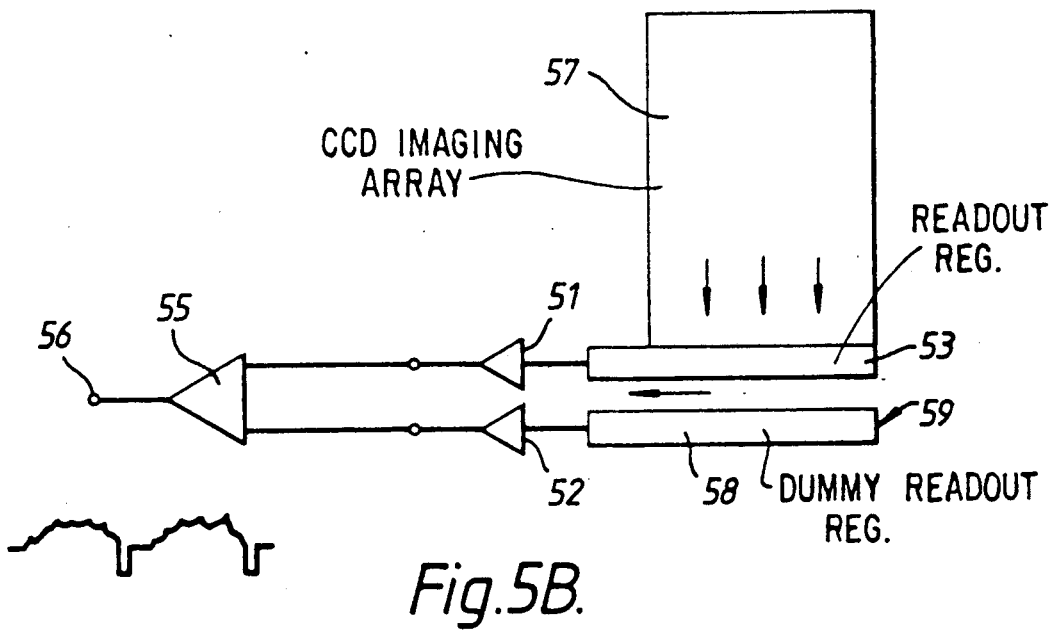
FIG. 5B shows a modification of FIG. 5A in which an extended dummy CCD shift register generates synchronising pulses in accordance with the invention.

FIG. 5B shows how the prior art arrangement of FIG. 5A can be modified in accordance with the invention. The modification comprises the provision of an extended dummy readout register 58 instead of the conventional dummy register 54 of FIG. 5A. This extended dummy register 58 may be the same length or longer than the readout register 53. In use a charge packet 59 is injected into the dummy register. This charge packet is then sequentially clocked through the dummy register, ultimately emerging at the far end to be amplified in the dummy register charge amplifier 52. Before the charge packet emerges, the dummy register output provides noise cancellation as in FIG. 5A. When the charge packet emerges, it has the effect of producing a large negative-going pulse on the output 56 of opposite polarity to the signals representing video information. This pulse of opposite polarity is readily extractable from the composite video signal.

If desired, a number of packets of charge may be injected rather than a single packet. This may be effected by simultaneous injection into a number of locations in the manner previously described in connection with FIG. 3. Alternatively packets of charge may be injected at a single location at different times to produce the desired charge pattern.

If the dummy register has the same number of stages N as the number of pixels per line, then the synchronising charge packet or packets will have to be introduced after the first pixel charge packed has been clocked out, as otherwise there would be no free locations in the shift register into which charge could be introduced without overriding pixel data. If the dummy register is made sufficiently long, then the one or more synchronising charge packets can be injected into suitable register locations prior to the reading out of charge packets from the readout register.

Figure 6:
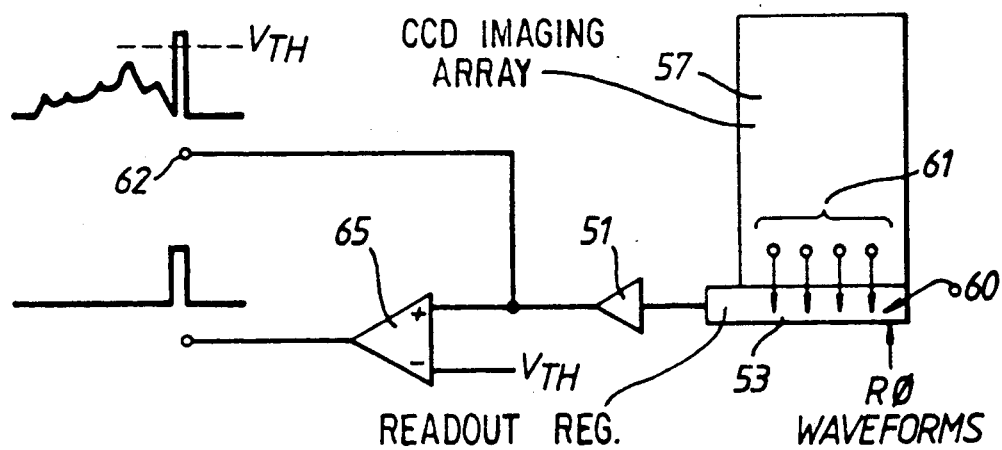
FIG. 6 shows how the line read out register of a CCD imager may be used to generate synchronising pulses in accordance with the invention.

FIG. 6 shows an arrangement in accordance with the invention utilising the readout register 53 itself to produce line synchronising pulses.

In certain types of current CCD imagers, the maximum quantity of photo-generated charge produced at a pixel is limited inter alia by anti-blooming drains which run between adjacent pixels. The readout register 53 is constructed so as to be capable of handling a predetermined multiple, e.g. 3 times this maximum quantity of charge. Thus a simple way of distinguishing the synchronising charge packet from the photo-generated packets is to make the synchronising charge packets appreciably larger than the maximum photo-generated charge packet.

Therefore, in this embodiment, when packets of charge 61 are transferred from the store section of the CCD to the readout register 53, a synchronising packet of charge 60 of magnitude much greater than the maximum charge of any of the packets of charge 61 is introduced into the register in a location upstream of the charge packets 61. The charge packets are clocked out of the readout register 53, amplified in a charge amplifier 51, to produce an output signal at 62 containing both video and synchronising information. The output signal at 62 is applied to one input of a comparator 65 whose other input is connected to a reference voltage source VTH, such that the comparator only gives an output pulse when a synchronising charge packet emerges from the readout register.

If desired, more than one packet of charge may be injected, either simultaneously at a number of locations, or sequentially at a single location as has been described in connection with FIG. 5B.

Figure 7:
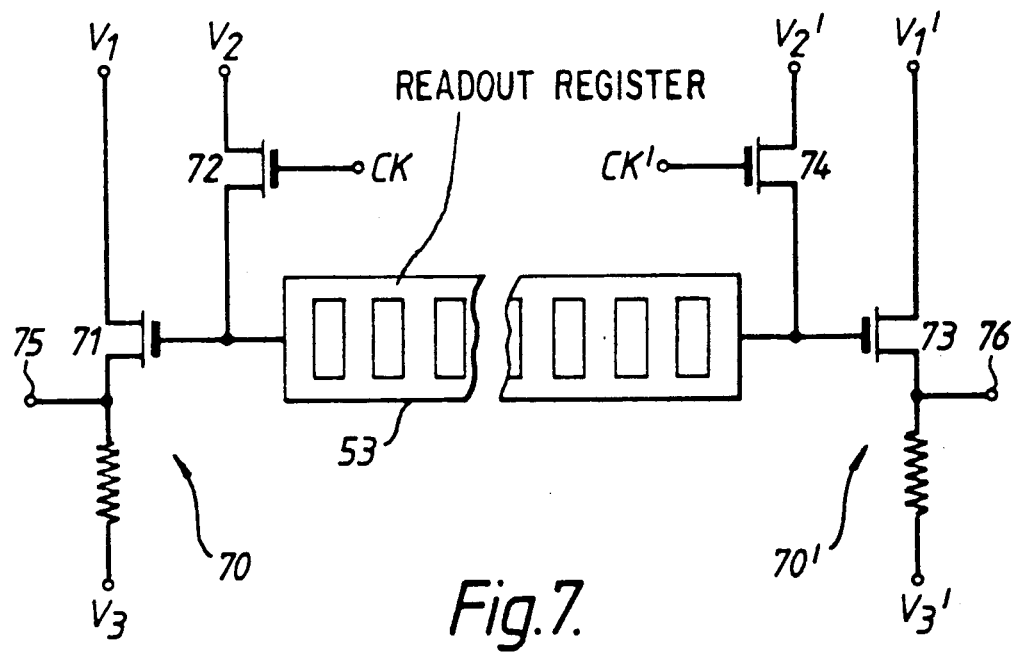
FIG. 7 shows one way in which charge packets can be injected into the read out register of a CCD imager.

FIG. 7 shows a way in which synchronising charge packets can be introduced into the read-out register of a current type of CCD imager with minimal modification. Current CCD imagers ofter have the facility to read charge out of the readout register 53 in either direction according to system requirements. To permit this, one end of the register is provided with a buffer or readout amplifier 70 and the other end is provided with a buffer or readout amplifier 70', but only one of the amplifiers 70 and 70' is actually used to read out data according to the direction of clocking of the readout register 53. Let us assume that charge is clocked from right to left and that therefore only the left-hand amplifier 70 is being used to amplify charge packets emerging from 53. The amplifier 70 comprises a MOSFET 71 connected as a source follower between voltage rails V1, V3 to produce a buffered output at 75. Between samples of charge, clock CK energises shorting MOSFET 72 to couple voltage source V2 to the gate electrode of 71 to sweep out the previous charge and to prepare 71 for amplifying the next charge packet emerging from 53. Charge is injected into the far end using the shorting MOSFET 74 of the unused output buffer or amplifier 70' (which also includes a MOSFET 73 connected as a source follower between voltage rails V1', V3' to permit a buffered output to be produced at 76 if the charge were being clocked the other way, from left to right). To this end, V2' is connected to a voltage source different from V2 so that, when CK' is energised at a suitable instant of time, charge flows into the end location of the shift register 53 from V2' via the source-drain path of 74. V2' should be sufficiently large that the charge packet so injected is much larger than the maximum photo-generated charge packet produced in the imager. This injected charge packet is then clocked through the register 53 along with the other charge packets as previously described in connection with FIG. 6. In this arrangement, if it is desired to inject a number of charge packets, the signal CK' is pulsed at appropriate instant of time so as to sequentially clock packets of charge in the desired pattern into the shift register.

It should be noted that the CCD or other imaging device need not be a rectangular array of elements. In one embodiment, for example, the CCD is a spiral of N elements, and a separate N stage shift register (which need not of course be a spiral) used to determine the timing. Other geometries are equally applicable to the invention.

It is also possible to have synchronising pulse generating shift registers having an integer multiple, e.g. 2 times, as many stages as there are rows and/or columns, and to clock the shift register at the corresponding multiple of the clock frequency.

I claim:

1. Solid-state imaging apparatus comprising; an imaging array having a region on which an image is formed, means to produce electrical charges representing said image, and output means to produce output signals representative of said image from said electrical charges; shift register means having clock input means, input port means, and an output port; means for introducing at least one packet of charge into said input port means of said shift register means; clock means for applying clock signals to said clock input means for said shift register means, said clock means for applying clock signals causing said electrical charges and said at least one packet of charge to be clocked respectively through said imaging array and said shift register means at rates which are related to one another; means for obtaining synchronising output signals from said output port, said synchronising output signals being delayed versions of said at least one packet of charge introduced into said input port means; and means for using said synchronising output signals as synchronising waveforms for said imaging array.

2. Apparatus as claimed in claim 1, wherein said imaging array is an M×N array in which N is the number of columns and M the number of rows.

3. Apparatus as claimed in claim 1, wherein said synchronising output signals are useable as line synchronisation signals for said imaging array.

4. Apparatus as claimed in claim 1, wherein said shift register means is adapted to be clocked once every line period of said imaging array, and said synchronising output signals are useable as field synchronisation signals for said imaging array.

5. Apparatus as claimed in claim 1, in which said imaging array comprises a line readout register having a first output terminal from which a second output signal is obtained, a dummy line read-out register having a second output terminal from which a third output signal is obtained, said shift register means comprising said dummy line read-out register.

6. Apparatus as claimed in claim 5 comprising means for combining said second and third output signals to produce a fourth output signal containing both image information and synchronising information, said means for combining comprising a first input port coupled to said first output terminal, a second input port coupled to said second output terminal, and an output port from which said fourth output signal is obtained.

7. Apparatus as claimed in claim 5 in which, during each line period of said imaging array, said at least one packet of charge comprises a single packet of charge fed into a single location of said dummy readout register.

8. Apparatus as claimed in claim 5 in which, during each line period of said imaging array, said at least one packet of charge comprises a plurality of separate charge packets, said plurality of separate charge packets being fed into a single location of said dummy readout register at different times during said line period.

9. Apparatus as claimed in claim 5 in which, during each line period, said at least one packet of charge comprises a plurality of separate charge packets, said plurality of separate charge packets being fed into different locations of said dummy readout register at different times during a single line period.

10. Apparatus as claimed in claim 1 in which said imaging array comprises a line readout register having a first output terminal from which a second output signal is obtained, said shift register comprising said line readout register, said second output signal containing both image information and synchronising information.

11. Apparatus as claimed in claim 10 in which said separate charge packets representing synchronising waveforms are of greater magnitude than the magnitude of the largest possible said electrical charge representing said image.

12. Apparatus as claimed in claim 11 in which, during each line period of said imaging array, said at least one packet of charge comprises a single packet of charge, said single packet of charge being fed into a single location of said line readout register.

13. Apparatus as claimed in claim 11 in which, during each line period of said imaging array, said at least one packet of charge comprises a plurality of separate charge packets, said plurality of separate charge packets being fed into a single location of said line readout register at different times.

14. Apparatus as claimed in claim 11 in which, during each line period of said imaging array, said at least one packet of charge comprises a plurality of separate charge packets, said plurality of separate charge packets being fed into different locations of said line readout register.

15. Apparatus as claimed in claim 11 in which said line readout shift register is adapted to enable information to be read therefrom in either direction, each end of said line readout shift register having a respective readout amplifier adapted to read out information from said line readout shift register, only one of said amplifiers being used according to the direction of clocking of said line readout shift register, said at least one packet of charge being fed into a single location of said line readout shift register, said single location comprising that location of said line readout shift register at the opposite end thereof from that location from which data is read out of said line readout shift register.

16. Apparatus as claimed in claim 1 wherein said array is a CCD array.

17. Apparatus adapted to provide synchronisation waveform signals for an imaging array, said apparatus comprising shift register means having clock input means, input port means, and an output port, means for introducing at least one packet of charge into said input port means of said shift register means; clock means for applying clock signals to said clock input means of said shift register means, said clock means causing said at least one packet of charge to be clocked through said shift register means; said shift register means having a predetermined number of stages such that said at least one packet of charge introduced into said input port means emerges from said output port at at least one predetermined later time period so as to provide said synchronisation waveform signals, said synchronisation waveform signals being delayed versions of said at least one packet of charge introduced into said input port means.

18. Apparatus as claimed in claim 17 in which said at least one packet of charge comprises a plurality of packets of charge, each said packet of charge being injected into a predetermined different element of said shift register means.

19. Apparatus as claimed in claim 17, in which said at least one packet of charge comprises a plurality of packets of charge, each said packet of charge being injected into a single predetermined element of said shift register means at different times.

* * * * *